(12) United States Patent
Mihashi (10) Patent No.: US 8,366,187 B2
(45) Date of Patent: Feb. 5, 2013

(54) SUNROOF APPARATUS

(75) Inventor: Ayumi Mihashi, Tochigi (JP)

(73) Assignee: Yachiyo Industry Co., Ltd., Sayama-shi, Saitama (JP)

( * ) Notice: Subject to any disclaimer, the term of this patent is extended or adjusted under 35 U.S.C. 154(b) by 0 days.

(21) Appl. No.: 13/271,687

(22) Filed: Oct. 12, 2011

(65) Prior Publication Data

US 2012/0091763 A1 Apr. 19, 2012

(30) Foreign Application Priority Data

Oct. 13, 2010 (JP) ................................ 2010-230232

(51) Int. Cl.
*B60J 3/02* (2006.01)
*B60J 7/00* (2006.01)
*B60J 7/043* (2006.01)

(52) U.S. Cl. ..................................................... 296/214
(58) Field of Classification Search .................. 296/214
See application file for complete search history.

(56) References Cited

U.S. PATENT DOCUMENTS

| | | | | |
|---|---|---|---|---|
| 4,978,165 | A * | 12/1990 | Schreiter et al. | 296/216.03 |
| 6,179,373 | B1 * | 1/2001 | Bohm et al. | 296/214 |
| 2004/0075304 | A1 * | 4/2004 | Cocaign | 296/214 |
| 2010/0032991 | A1 | 2/2010 | Keller | |
| 2010/0170645 | A1 | 7/2010 | Lin | |

FOREIGN PATENT DOCUMENTS

| | | |
|---|---|---|
| DE | 101 01 491 C1 | 5/2002 |
| DE | 10 2004 020 338 A1 | 8/2005 |
| DE | 10 2008 035 514 A1 | 2/2010 |
| FR | 2 842 466 A1 | 1/2004 |
| JP | 2006-131163 A | 5/2006 |
| JP | 2008-137628 A | 6/2008 |

OTHER PUBLICATIONS

European Search Report application No. 11185080.6 dated Jan. 2, 2012.

* cited by examiner

*Primary Examiner* — Dennis Pedder
(74) *Attorney, Agent, or Firm* — Squire Sanders (US) LLP (57) ABSTRACT

The present invention provides a sunroof apparatus including: a roof panel; a driving motor; and a shade. The roof panel is disposed in a fixed roof of a vehicle, for being moved in a longitudinal direction of the vehicle via sliders to be opened and closed. The sliders are coupled to driving wires. The driving motor is for driving the driving wires. The shade is wound around a winding shaft, to be drawn from the winding shaft, passed through an inclination displacement space, and then guided in shade guide rails, for being moved in the longitudinal direction of the vehicle and thereby opening and closing an indoor opening. The inclination displacement space is inclined relative to a horizontal plane and formed between the winding shaft and the shade guide rails. The driving motor is disposed within the inclination displacement space in the longitudinal direction of the vehicle.

4 Claims, 7 Drawing Sheets

SUNROOF APPARATUS

CROSS-REFERENCE TO RELATED APPLICATION

This application claims the foreign priority benefit under 35 U.S.C §119 of Japanese Patent Application No. 2010-230232 filed on Oct. 13, 2010, the disclosure of which is incorporated herein by reference.

BACKGROUND OF THE INVENTION

1. Field of the Invention

The present invention relates to a sunroof apparatus for a vehicle.

2. Description of the Invention

Examples of conventional sunroof apparatuses include an apparatus described in Japanese Unexamined Patent Application Publication No. 2006-131163 (hereafter, referred to as patent publication 1). The apparatus has a roof panel and a driving motor. The roof panel is disposed in a fixed roof of a vehicle so as to be opened and closed in a longitudinal direction of the vehicle via sliders coupled to driving wires. The driving motor is for driving the driving wires. The patent publication 1 discloses a construction in which the driving motor is disposed in front of an opening formed in the fixed roof.

Examples of shades each disposed below a roof panel include a so-called roller shade which is wound in the form of a roll around a winding shaft and contained (See, for example, Japanese Unexamined Patent Application Publication No. 2010-36898 (hereafter, referred to as patent publication 2)). The patent publication 2 describes a technique of folding, when the shade is drawn from a winding shaft, opposite edge portions of the shade before guiding those edge portions in shade guide rails. This technique makes it impossible for the edge portions of the shade to come easily off from the shade guide rails. The edge portions of the shade that are folded have a backlash force to get back to their initial shape. The entire folded edge portions have the backlash force continuously. Thus, even if, for example, an external load is applied to part of the edge portions of the front shade to make that part almost come off from the shade guide, the backlash force in the areas of the edge portions that are adjacent to that part acts to prevent that part from coming off from the shade guide rail.

Japanese Unexamined Patent Application Publication No. 2008-137628, which is a prior art document on the roller shade, describes arranging a pair of winding shafts with an opening sandwiched therebetween in a longitudinal direction of a vehicle.

Regarding the layout of a driving motor for a roof panel and a winding shaft for a shade, these components should be displaced in relation to each other in a longitudinal direction of a vehicle since it is difficult to dispose them in vertically aligned relation to each other from the view point of space-saving in a sunroof apparatus. Although the present inventor was not able to find appropriate prior art documents on the layout of the driving motor and the winding shaft, he has noticed that if the roller shade of, for example, the patent publication 1 is applied to the construction disclosed in the patent publication 2 in which the driving motor for the roof panel is disposed in front of the opening, it is resulted that the driving motor and the shade winding shaft are arranged in the longitudinal direction of the vehicle. In that case, it is important that a predetermined amount of distance is ensured between the opposite ends of the opening in arranging the driving motor and the winding shaft.

The present invention is made in view of the above problem, and an object of the present invention is to provide a sunroof apparatus that realizes a mitigation in a reduction in the distance between the opposite ends of the opening, the reduction derived from the layout of a driving motor for a roof panel and a winding shaft for a shade.

SUMMARY OF THE INVENTION

In one aspect of the present invention, there is provided a sunroof apparatus comprising: a roof panel disposed in a fixed roof of a vehicle, for being moved in a longitudinal direction of the vehicle via sliders to be opened and closed, the sliders coupled to driving wires; a driving motor for driving the driving wires; and a shade wound into a roll shape around a winding shaft, to be drawn from the winding shaft, passed through an inclination displacement space, and then guided in shade guide rails, for being moved in the longitudinal direction of the vehicle and thereby opening and closing an indoor opening, the inclination displacement space being inclined relative to a horizontal plane and formed between the winding shaft and the shade guide rails, wherein the driving motor is disposed within the inclination displacement space in the longitudinal direction of the vehicle.

In the so-called roller shade, it is inevitable that the inclination displacement space is formed between the shaft and guide rails in a drawing route of the front shade, the area immediately adjacent to where the front shade gets off from the winding shaft. The present invention utilizes the inclination displacement space as a space for the driving motor such that the inclination displacement space serves also as the space for the driving motor in the longitudinal direction of the vehicle. Consequently, the indoor opening can be made large enough by the space otherwise exclusively occupied by the driving motor.

The above-mentioned sunroof apparatus has a feature that the shade has an edge portion, the edge portion folded in the shade guide rail when the shade is guided, the edge portion being folded while passing through a folding stroke formed within the inclination displacement space.

According to the above constitution of the present invention in which the shade has opposite edge portions folded in the shade guide rails when the shade is guided, the indoor opening can be made large enough.

The above-mentioned sunroof apparatus has a feature that the winding shaft comprises a pair of a front winding shaft and a rear winding shaft disposed with the indoor opening sandwiched therebetween, and the shade comprises a front shade and a rear shade wound around the front winding shaft and the rear winding shaft, respectively, the front shade and the rear shade abutting on each other midway between opposite ends of the indoor opening to close the indoor opening, and wherein the driving motor is disposed within either one of the inclination displacement space in the front shade and the inclination displacement space in the rear shade.

In the case of a sunroof apparatus with a single winding shaft, allowance can be provided in the layout design around the indoor opening if, for example, a driving motor for a roof panel is arranged in a front side of a vehicle and the winding shaft is arranged in a rear side with an indoor opening sandwiched between the driving motor and the winding shaft. In the case of a sunroof apparatus in which the winding shaft comprises a pair of a front winding shaft and a rear winding shaft arranged with the indoor opening therebetween, however, the driving motor and either one of the front winding shaft and the rear winding shaft should be arranged side by side, imposing constraints on the layout design around the indoor opening. In contrast, in the above constitution of the present invention, in which the driving motor is disposed within either one of the inclination displacement space in the front shade and the inclination displacement space in the rear shade, the above constraints are lessened. Consequently, the indoor opening can be made large enough.

Other features and advantages of the present invention will become more apparent from the following detailed description of the invention when taken in conjunction with the accompanying exemplary drawings.

DETAILED DESCRIPTION OF THE PREFERRED EMBODIMENT

Figure 1A:
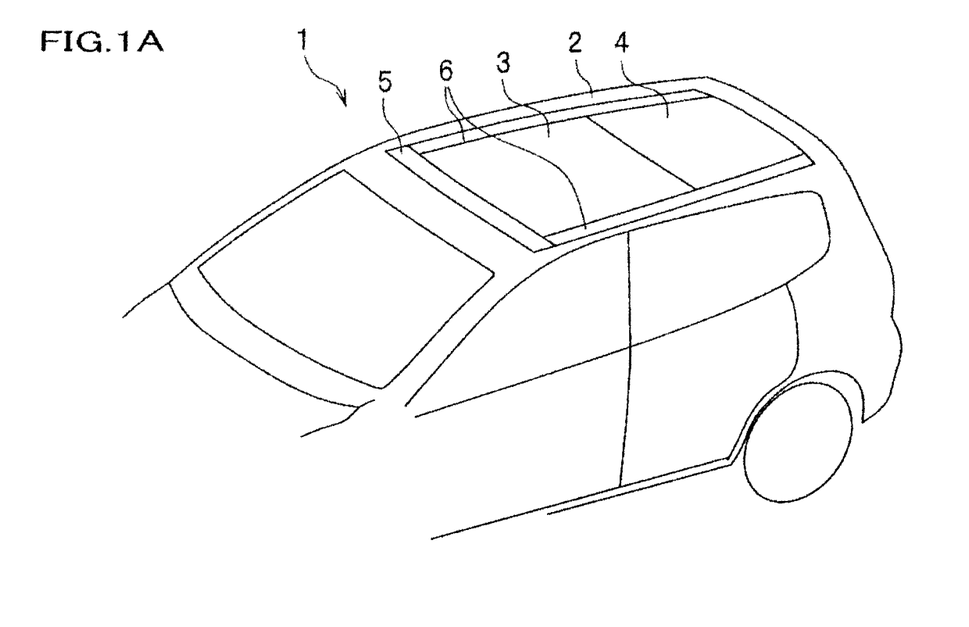
FIG. 1A is a view showing an external appearance of a sunroof apparatus according to the present invention with a roof panel thereof closed.
Figure 1B:
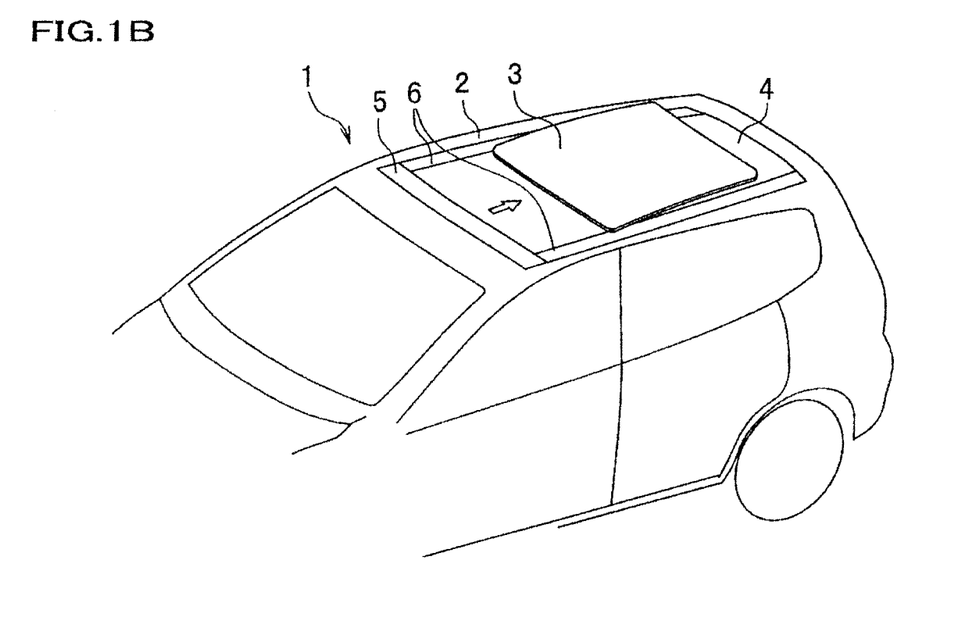
FIG. 1B is a view showing an external appearance of the sunroof apparatus according to the present invention with the roof panel thereof closed.
Figure 5:
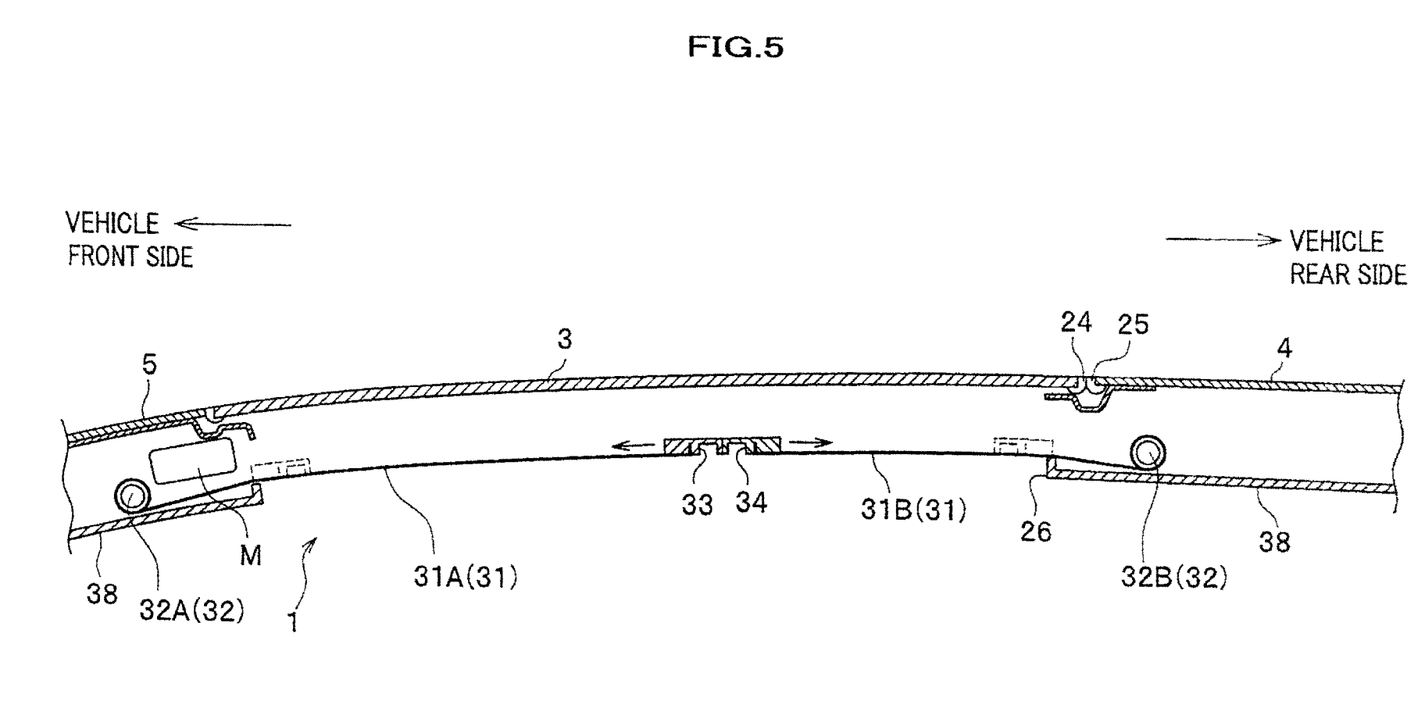
FIG. 5 is a side view showing a driving motor for the roof panel and shades according to the present invention.

A sunroof apparatus 1 according to the present invention includes, as shown in FIG. 1, a roof panel 3 attached to a fixed roof 2 of a vehicle and, as shown in FIG. 5, a shade 31 provided below the roof panel 3.

<Roof Panel 3>

As shown in FIG. 1, the roof panel 3 is designed to be opened and closed in the fixed roof 2 of the vehicle. When being opened, the roof panel 3 tilts up and then moves rearward. Attached also to the fixed roof 2 are a fixed panel 4, a front garnish 5 and side garnishes 6. The fixed panel 4 is positioned behind the roof panel 3. The front garnish 5, which extends in a transverse direction of the vehicle, is positioned in front of the roof panel 3. The side garnishes 6, which extend in a longitudinal direction of the vehicle, are respectively positioned on the opposite sides of the roof panel 3 and of the fixed panel 4. The fixed panel 4, the front garnish 5 and the side garnishes 6 are all secured to the fixed roof 2. The roof panel 3 and the fixed panel 4 are panels made of, for example, glass, and the front garnish 5 and the side garnishes 6 are panels made of, for example, resin. As shown in FIG. 3, the roof panel 3 has a weatherstrip 24 attached along the periphery thereof. The weatherstrip 24 is made of rubber or the like. The fixed panel 4 has a weatherstrip 25 attached along the front edge thereof. When the roof panel 3 is fully closed, the weatherstrip 24 is pressed against the weatherstrip 25, the front garnish 5 and the side garnishes 6 with elastic deformation.

The roof panel 3 is a panel relatively large and heavy. When the roof panel 3 is opened, the weight thereof is supported by front sliders 7 and rear sliders 8 shown in FIG. 2 at the four corners of the roof panel. Disposed below the side edges of the roof panel 3 when viewed with the roof panel 3 closed are front guide rails 9 for guiding the sliding of the front sliders 7. Disposed below the side edges of the fixed panel 4 are rear guide rails 10 for guiding the sliding of the rear sliders 8. The front guide rails 9 and the rear guide rails 10 are made of, for example, an extruded aluminum alloy. Reference numeral 26 signifies an indoor opening.

Figure 2:
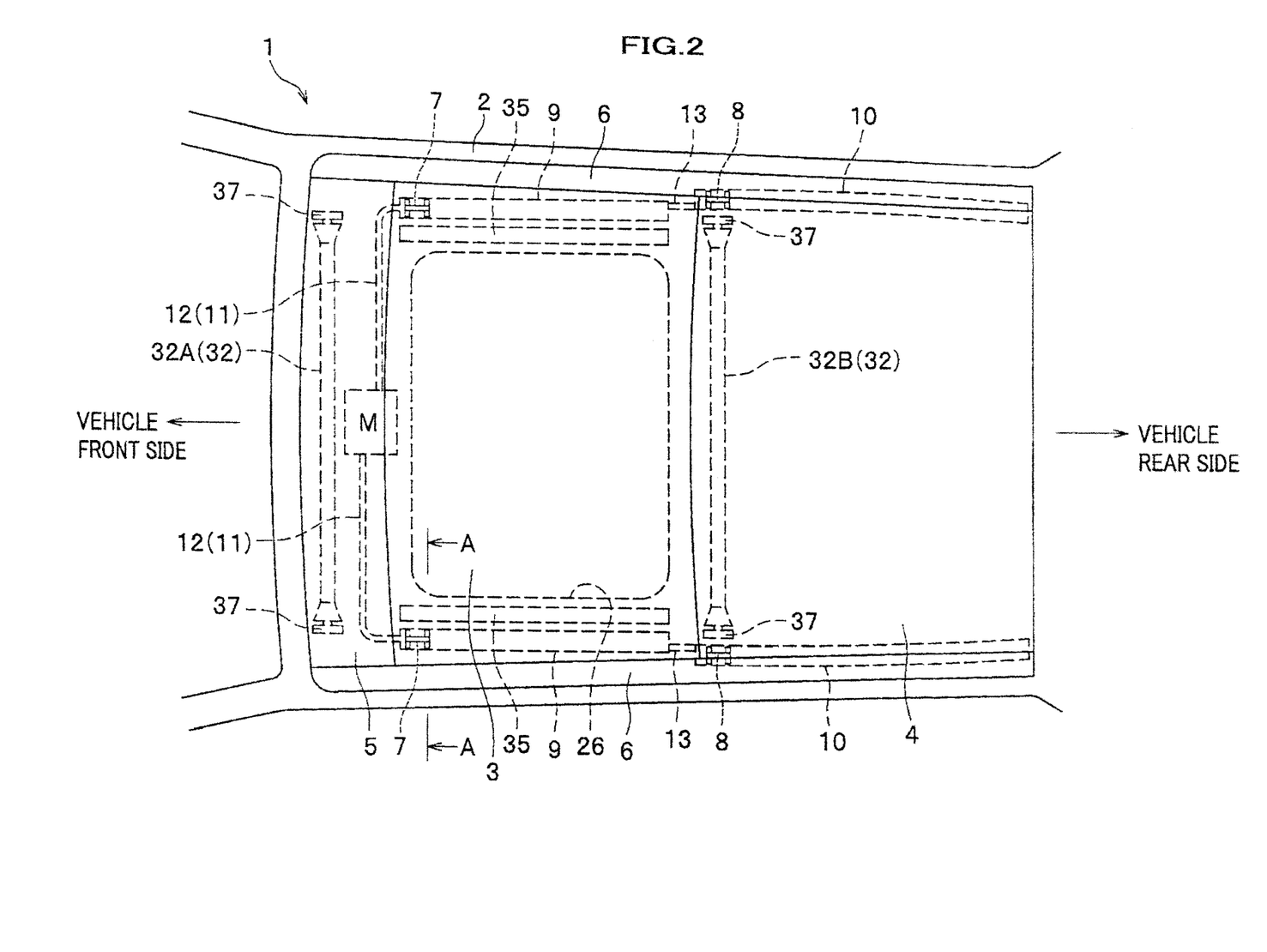
FIG. 2 is a plan view of the sunroof apparatus according to the present invention.

The front sliders 7 and the rear sliders 8 are coupled to push-pull cables 11, which are driving wires. A driving motor M for driving the push-pull cables 11 is disposed below the front garnish 5. The push-pull cables 11 is guided by guide pipes 12 between the driving motor M and the front guide rails 9 and by connection pipes 13 between the front guide rails 9 and the rear guide rails 10.

A brief description will be made of a tilting mechanism of the roof panel 3. As shown in FIGS. 3A-3D, each of first panel brackets 14 of the roof panel 3 has a first lift guide pin 15. The first lift guide pin 15 is slidably engaged with a first lift guide grooves 16 formed in the front slider 7. Each of second panel brackets 17 of the roof panel 3 has a first coupling pin 18. The first coupling pins 18 are inserted in slots 20 of linking arms 19. The slot 20 is formed at one end of the linking arm 19. The linking arm 19 has a second coupling pin 21 at the other end thereof. The second coupling pins 21 are rotatable and movable along the rear guide rails 10. The linking arm 19 has a second lift guide pin 22 at the middle thereof. The second lift guide pins 22 are slidably engaged with second lift guide grooves 23 formed in the rear sliders 8.

Figure 3A:
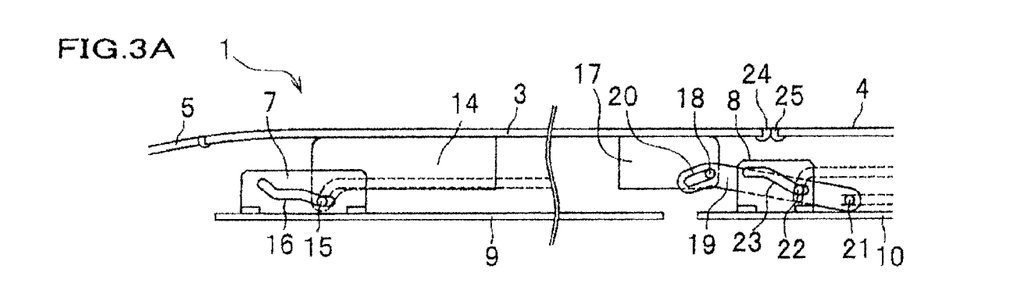
FIGS. 3A-3D are side views of the sunroof apparatus according to the present invention for explaining a tilting action and a sliding action of the roof panel.
Figure 3B:
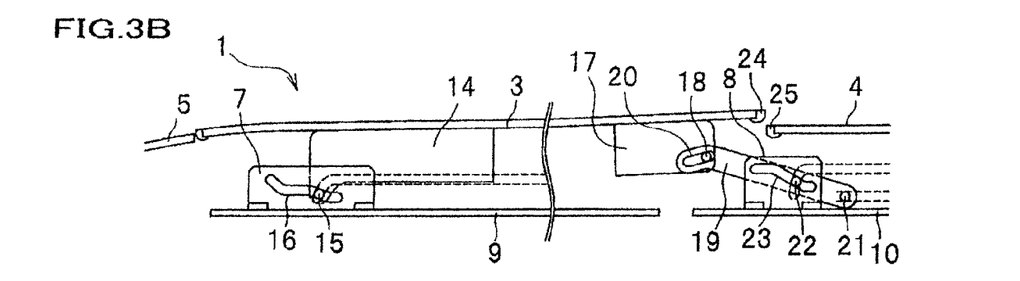
Figure 3C:
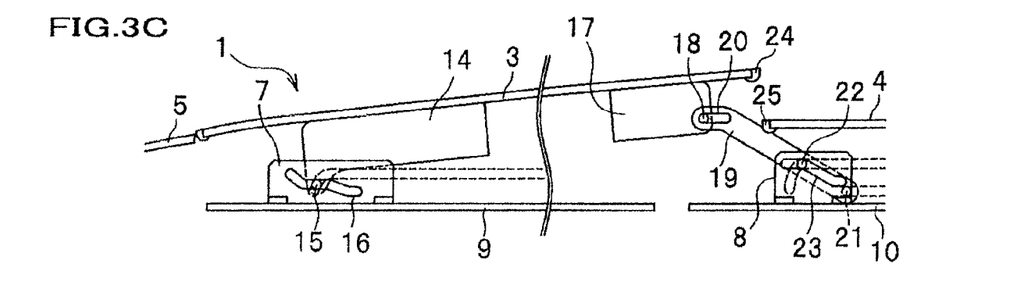
Figure 3D:
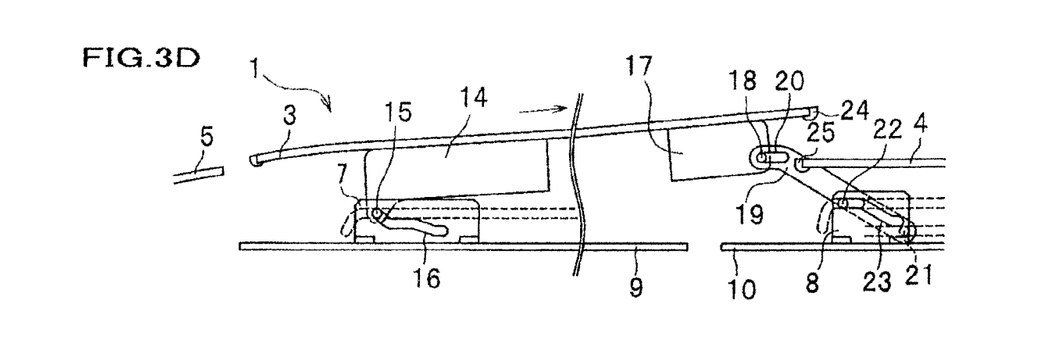

From the fully closed state of the roof panel 3 shown in FIG. 3A, the front sliders 7 and the rear sliders 8 are moved rearward as a unit by the driving force of the driving motor M (FIG. 2) via the push-pull cables 11, when the inner walls of the first lift guide grooves 16 push the first lift guide pins 15 upward and the inner walls of the second lift guide grooves 23 push the second lift guide pins 22 upward to erect the linking arms 19 as shown in FIGS. 3B and 3C, thereby tilting up the roof panel 3. After the completion of the tilting up, the front sliders 7 and the rear sliders 8 move further rearward. This causes the inner walls at the respective ends of the first lift guide grooves 16 to push the first lift guide pins 15 rearward and the inner walls at the respective ends of the second lift guide grooves 23 to push the second lift guide pins 22 rearward thereby to move the roof panel 3 rearward as shown in FIG. 3D. It should be noted that during the movement of the roof panel 3, the second panel brackets 17 and the linking arms 19 pass in the gaps between the fixed panel 4 and the side garnishes 6.

<Shade 31>

Descriptions will be made of the shade 31. As shown in FIG. 5, the shade 31 is a so-called roller shade which is wound in the form of a roll around a winding shaft and contained. The shade 31 is made of a flexible material. In the embodiment, the shade 31 is of a type divided into two: a front shade 31A and a rear shade 31B. To harmonize with the use of the shade 31 of this type, winding shafts 32 are disposed as a pair of a front shaft and a rear shaft with the indoor opening 26 sandwiched theretween. That is, a front winding shaft 32A that winds the front shade 31A therearound is disposed in front of the indoor opening 26 with the axis of the front winding shaft 32A set in the transverse direction of the vehicle, while a rear winding shaft 32B that winds the rear shade 31B is disposed behind the indoor opening 26 with the axis of the rear winding shaft 32B set in the transverse direction of the vehicle. As shown in FIG. 2, the front winding shaft 32A and the rear winding shaft 32B are both rotatably supported by holders 37 secured to unillustrated brackets.

As shown in FIG. 5, the front shade 31A and the rear shade 31B are made to abut on each other, more specifically, a front handle 33 and a rear handle 34 on their respective edges are made to abut on each other, midway between the opposite ends of the indoor opening 26 to close the indoor opening 26. Shown in phantom in the figure is where the front handle 33 and the rear handle 34 are positioned when the indoor opening 26 is fully opened. Reference numeral 38 signifies a roof lining covering the vehicle interior ceiling. It should be noted that a description is omitted of a mechanism of holding the front shade 31A and the rear shade 31B at given opening positions since it departs from the purpose of the present invention.

Figure 7A:
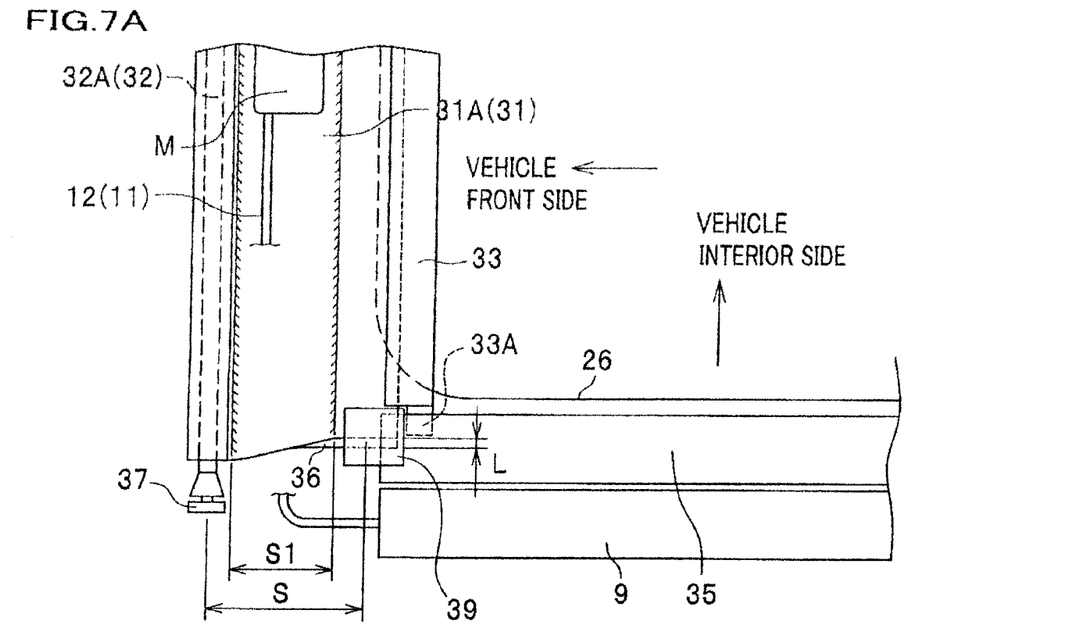
FIG. 7A is a plan view showing the driving motor for the roof panel and the shade closed according to the present invention.
Figure 7B:
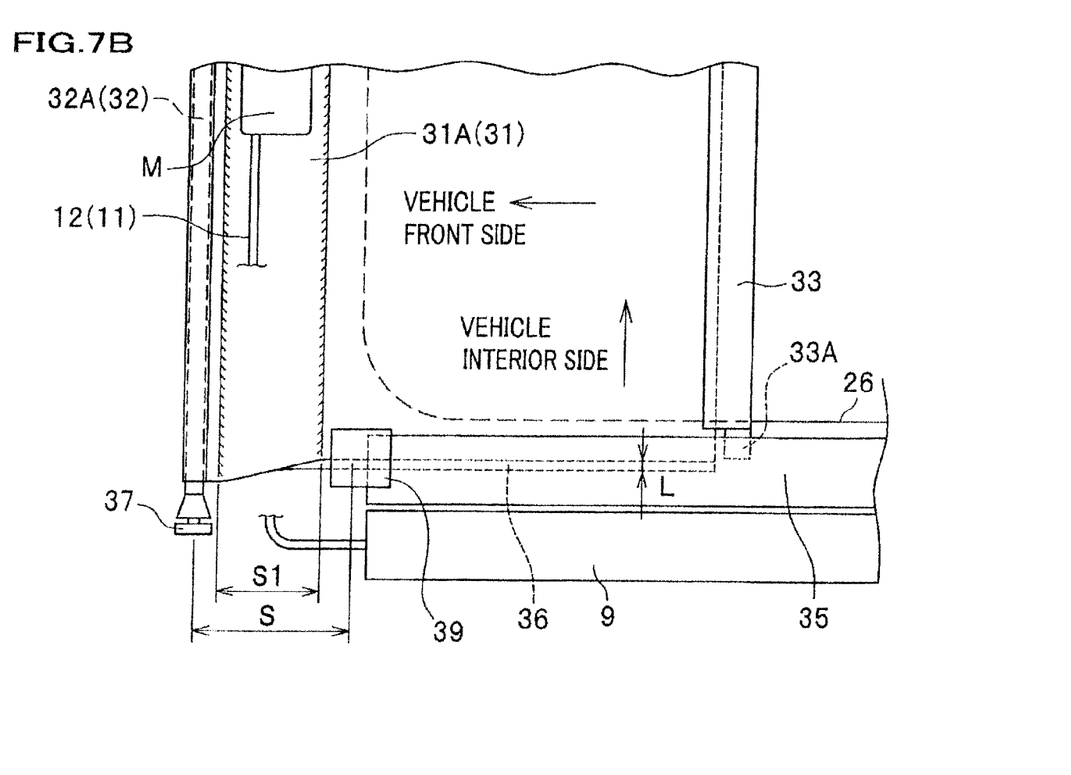
FIG. 7B is a plan view showing the driving motor for the roof panel and the shade opened according to the present invention.

As shown in FIGS. 2, 4, 7A and 7B, shade guide rails 35 are disposed more inwardly from the front guide rails 9. The shade guide rails 35 are made of, for example, an extruded aluminum alloy. As shown in FIGS. 7A and 7B, slide shoes 33A are engaged with the shade guide rails 35 slidably in the longitudinal direction of the vehicle. The slide shoes 33A are provided projectingly on the sides of the front handle 33. Similar slide shoes (not illustrated) are provided projectingly on the sides of the rear handle 34.

Figure 6:
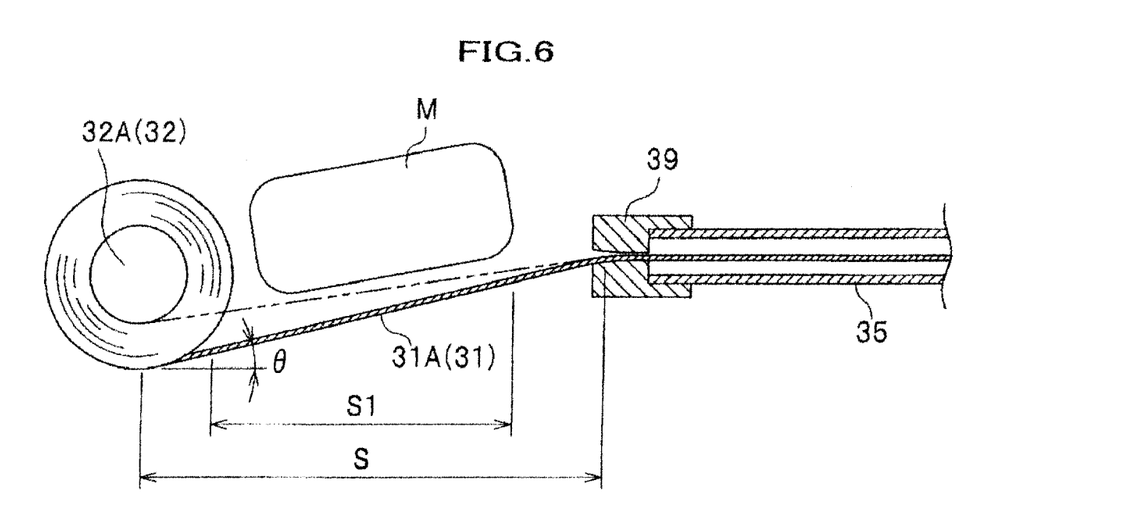
FIG. 6 is a side view showing the driving motor for the roof panel, the shade and a shade guide rail according to the present invention.

As shown in FIGS. 6, 7A and 7B, the shade guide rails 35 have multifunction stoppers 39 on their front edges. The multifunction stoppers 39 comprise, for example, resin molded parts. The multifunction stoppers 39 are members that have both the function of positioning the front handle 33 by abutting on the slide shoes 33A when the front shade 31A is fully opened, and the function of smoothly guiding the movement of the front shade 31A between an inclination displacement space S to be described later and the shade guide rails 35.

The roller shade structure in which the front shade 31A is wound around the front winding shaft 32A and contained has the inclination displacement space S that is inclined relative to a horizontal plane when viewed from the side as shown in FIG. 6. The inclination displacement space S is formed between the front winding shaft 32A and the shade guide rails 35 in a drawing route of the front shade 31A. In FIG. 6, the route is shown in full lines when the front shade 31A is wound in a greater amount on the front winding shaft 32A, while the route is shown in phantom lines when the front shade 31A is wound in a smaller amount.

Thus, it is inevitable that the inclination displacement space S is formed between the front winding shaft 32 and the shade guide rails 35. If a length of the inclination displacement space S in the longitudinal direction of the vehicle, that is, a distance between the front winding shaft 32A and the shade guide rails 35, is reduced, a tilt angle θ formed with the front shade 31A increases. The increase in the tilt angle θ causes an increase in a quantity of a vertical component of a tension force on a portion of the front shade 31A that extends the length of the inclination displacement space S in the longitudinal direction of the vehicle. This induces an increase in a loss in a quantity of a horizontal component of a load assumed in operating the front handle 33 (FIG. 5). As a result, a greater amount of manual force is required for moving the front handle 33. This is why there should be a certain amount of margin in the length of the inclination displacement space S in the longitudinal direction of the vehicle. Especially when a folding stroke S1 is formed as described later, the inclination displacement space S should be equal to or greater than the folding stroke S1 in length in the longitudinal direction of the vehicle.

Figure 4:
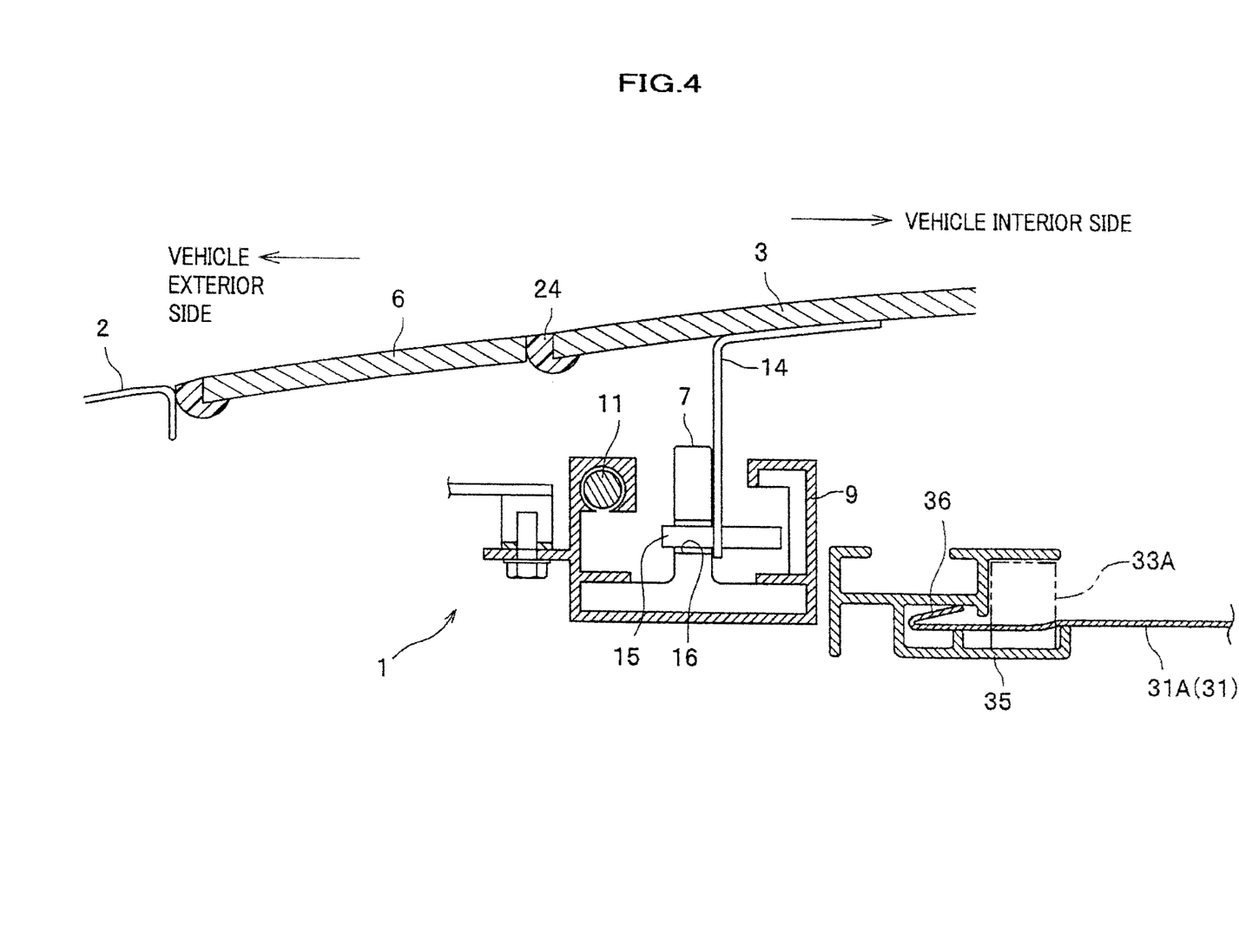
FIG. 4 is a sectional view taken along A-A in FIG. 2.

In the embodiment, the front shade 31A drawn from the front winding shaft 32A is passed through the folding stroke S1 before being guided in the shade guide rails 35 to open and close the indoor opening 26 in the longitudinal direction of the vehicle. The folding stroke S1 is formed within the inclination displacement space S. In the folding stroke S1, opposite edge portions of the front shade 31A are folded so that the front shade 31A is guided with the opposite edge portions folded in the shade guide rails 35. The edge portions of the front shade 31A which are formed into upwardly folded portions 36 and which are guided in the grooves of the shade guide rails 35 as shown in FIG. 4 have a backlash which acts to let the edge portions get back to their initial shape. The entire folded edge portions have the backlash continuously. Thus, even if, for example, an external load is applied from inside the vehicle to part of the edge portions of the front shade 31A, the backlash force in the areas of the edge portions of the front shade 31A that are adjacent to that part acts to prevent that part from coming off from the shade guide rail 35. Thus, it is impossible for the edge portions of the front shade 31A to come easily off from the shade guide rails 35. The same holds true for the rear shade 31B.

In the structure in which the edge portions of the front shade 31A are folded in mid-course after being drawn from the front winding shaft 32A, the folding stroke S1 should have some amount of margin therein and be long enough to have the folded portions 36 move in the shade guide rails 35 parallel thereto without having any wrinkles on the front shade 31A. When, a length L by which the edge portions are folded over is set to, for example, about 10 mm, the folding stroke S1 needs to be at least about 10 cm long, which means that the length of the inclination displacement space S in the longitudinal direction of the vehicle needs to be equal to or greater than 10 cm.

The sunroof apparatus 1 described above, if having the driving motor M in front of the front winding shaft 32A, needs to include a space for the driving motor M, a space for the front winding shaft 32A and the inclination displacement space S all in front of the indoor opening 26 arranged in series in the longitudinal direction of the vehicle. This causes the risk that the indoor opening 26 cannot be made large enough.

In contrast, in the present invention, as shown in FIGS. 6, 7A and 7B, the driving motor M is disposed within the inclination displacement space S, more specifically within the folding stroke S1 (shown in diagonal lines) in the longitudinal direction of the vehicle. Thus, necessary to be provided in front of the indoor opening 26 are only the space for the front winding shaft 32A and the inclination displacement space S which serves also as the space for the driving motor M. This eliminates the need for providing a separate space for the driving motor M in the longitudinal direction of the vehicle. Consequently, the indoor opening 26 can be made large. It should be noted that there is no need for the driving motor M to be entirely accommodated within the inclination displacement space S, and part of the driving motor M may be disposed more or less outside the inclination displacement space S. The driving motor M, below which the front shade 31A is positioned, is attached to and supported by unillustrated brackets positioned above the driving motor M. The guide pipes 12 is also laid above the front shade 31A in order not to interfere with the front shade 31A.

In the above, descriptions have been made of a preferred embodiment of the present invention. In the illustrated embodiment, the driving motor M is disposed within the inclination displacement space S in the front shade 31A. In the case where the driving motor M is disposed behind the indoor opening 26, however, the driving motor M may be arranged within the inclination displacement space S in the rear shade 31B.

Further, the present invention is also applicable to a sunroof apparatus with a single shade 31.

The present invention utilizes the inclination displacement space formed between the shaft for winding the shade and the shade guide rail as the space for the driving motor, eliminating the need for providing a separate space for the driving motor. Consequently, the indoor opening can be made large enough.

The embodiment of the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A sunroof apparatus comprising:
    a roof panel disposed in a fixed roof of a vehicle, for being moved in a longitudinal direction of the vehicle via sliders to be opened and closed, the sliders coupled to driving wires;
    a driving motor for driving the driving wires; and
    a shade wound into a roll shape around a winding shaft, to be drawn from the winding shaft, passed through an inclination displacement space, and then guided in shade guide rails, for being moved in the longitudinal direction of the vehicle and thereby opening and closing an indoor opening, the inclination displacement space being inclined relative to a horizontal plane and formed between the winding shaft and the shade guide rails,
    wherein the driving motor is disposed within the inclination displacement space in the longitudinal direction of the vehicle.

2. The sunroof apparatus according to claim 1, wherein the shade has an edge portion, the edge portion folded in the shade guide rail when the shade is guided, the edge portion being folded while passing through a folding stroke formed within the inclination displacement space.

3. The sunroof apparatus according to claim 1, wherein the winding shaft comprises a pair of a front winding shaft and a rear winding shaft disposed with the indoor opening sandwiched therebetween, and the shade comprises a front shade and a rear shade wound around the front winding shaft and the rear winding shaft, respectively, the front shade and the rear shade abutting on each other midway between opposite ends of the indoor opening to close the indoor opening, and
    wherein the driving motor is disposed within either one of the inclination displacement space in the front shade and the inclination displacement space in the rear shade.

4. The sunroof apparatus according to claim 2, wherein the winding shaft comprises a pair of a front winding shaft and a rear winding shaft disposed with the indoor opening sandwiched therebetween, and the shade comprises a front shade and a rear shade wound around the front winding shaft and the rear winding shaft, respectively, the front shade and the rear shade abutting on each other midway between opposite ends of the indoor opening to close the indoor opening, and
    wherein the driving motor is disposed within either one of the inclination displacement space in the front shade and the inclination displacement space in the rear shade.

* * * * *